United States Patent [19]
Woundy

[11] Patent Number: 6,031,841
[45] Date of Patent: Feb. 29, 2000

[54] RSVP SUPPORT FOR UPSTREAM TRAFFIC

[75] Inventor: Richard Woundy, Reading, Mass.

[73] Assignees: MediaOne Group, Inc., Englewood; U S West, Inc., Denver, both of Colo.

[21] Appl. No.: 08/996,349

[22] Filed: Dec. 23, 1997

[51] Int. Cl.[7] ............................. H04L 12/28; H04B 7/212
[52] U.S. Cl. ............................................. 370/410; 370/443
[58] Field of Search .................................... 370/351, 352, 370/353, 356, 384, 385, 395, 401, 410, 414, 431, 437, 443, 447, 465

[56] References Cited

U.S. PATENT DOCUMENTS

| | | | |
|---|---|---|---|
| 5,574,724 | 11/1996 | Bales et al. | 370/410 |
| 5,592,477 | 1/1997 | Farris et al. | 370/410 |
| 5,621,728 | 4/1997 | Lightfoot et al. | 370/397 |
| 5,631,903 | 5/1997 | Dianda et al. | 370/410 |
| 5,677,905 | 10/1997 | Bigham et al. | 370/395 |

*Primary Examiner*—Huy D. Vu
*Assistant Examiner*—Chiho Andrew Lee
*Attorney, Agent, or Firm*—Brooks & Kushman P.C.

[57] ABSTRACT

A method for managing MAC messages is provided which supports dynamic resource reservation for upstream data traffic in a broadband cable system. Three specialized MAC management messages of Dynamic Session Addition, Dynamic Session Deletion, and Dynamic Session Acknowledgment are used to control setting of a filter spec parameter in a cable modem. The present invention provides upstream bandwidth resource reservation which allows packet scheduling to occur at a CMTS, and packet classification to occur at a cable modem. Such an arrangement allows the RSVP protocol to be adapted for use at the OSI protocol layer of a typical cable modem, thereby improving efficiency of network bandwidth/resource allocation.

8 Claims, 1 Drawing Sheet

RSVP SUPPORT FOR UPSTREAM TRAFFIC

TECHNICAL FIELD

The present invention generally relates to systems for providing internetwork data distribution over a broadband cable data network, and more particularly to a method and system for MAC message management to support dynamic bandwidth/resource reservation for upstream traffic in a data-over-cable context.

BACKGROUND ART

Resource ReSerVation Protocol (RSVP) is a resource reservation setup protocol currently being standardized by the Internet Engineering Task Force (IETF). RSVP provides receiver-initiated setup of resource reservations for multicast and unicast data flows.

Referring to FIG. 1, a basic broadband cable data distribution system 10 is shown as having a cable head end/distribution hub 12 connected to one or more audio/video and data sources 14, such as a satellite receiver. The cable head end 12 distributes the received signals to a plurality of end user computers 16 using at least one cable modem termination service (CMTS) 18 and a coaxial or hybrid optical/coaxial cable 20. The CMTS 18 provides dynamic allocation or reservation of network bandwidth/resources to selectively control access and quality of service to the network for end users 16. The end users are typically connected to the network via a cable modem (CM) 22. With respect to downstream bandwidth, end users share the bandwidth in accordance with a time sharing allocation protocol, such as an Ethernet contention protocol, or a specially granted service I.D. (SID) generated by the CMTS in accordance with a predetermined time allocation map.

Generally, the basic RSVP protocol assumes the implementation of two modules on each RSVP-capable node to forward data packets: the "packet classifier" and the "packet scheduler." The packet classifier determines the route and quality of service (QOS) class for each packet, and sends the packet to the packet scheduler. The RSVP packet classifier uses a "filter spec" which matches a particular source internet protocol (IP) address and source port to classify and restrict traffic that consumes reservation resources/bandwidth. The packet scheduler makes packet forwarding decisions such as queuing decisions to achieve a predetermined QOS on the interface. The RSVP packet scheduler uses a "flow spec" which identifies token packet parameters, peak data rate, etc. to identify the desired QOS.

In the context of RSVP for upstream traffic, it is desirable for the CM to perform the "packet classifier" function, but the CMTS to perform most of the "packet scheduler" function. While CMTS have utilized different levels of SIDs relating to different levels of quality of services, such arrangements have been fixed and inefficient in that there was no ability to control how much of the available resources a user would be able to reserve. Thus, a need exists for an arrangement which can adequately support a split of function between the CMTS and the CM to dynamically allow reservation of available upstream bandwidth and corresponding improvement in system efficiency.

DISCLOSURE OF THE INVENTION

It is therefore an object of the present invention to provide a method for managing MAC messages to support resource reservation for upstream traffic in a broadband cable system, i.e., a data-over-cable context.

In accordance with this and other objects, the present invention supports the above-noted split of function by providing a method for MAC management which utilizes three specialized MAC management messages of Dynamic Session Addition, Dynamic Session Deletion, and Dynamic Session Acknowledgment, and a management protocol relating thereto.

More specifically, the present invention provides a method for dynamically allocating upstream network resources in a broadband cable data distribution network having the steps of transmitting a resource reservation signal from a cable modem indicative of an amount of network resources needed for upstream communication, and in response to the reservation signal, determining at a CMTS whether upstream resources are available. If so, a SID message is generated at the CMTS to indicate at least one filter spec parameter responsive to the reserved resources. Once the SID message is received at the cable modem, a filter spec parameter is set in the cable modem equal to the at least one filter spec parameter in the received SID message. Then, an upstream communication matching the set filter spec can be sent by the cable modem.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The present invention provides a MAC message management arrangement which allows dynamic reservation of upstream traffic by a cable modem (CM), and can operate in conjunction and support of RSVP. More specifically, a Dynamic Session Addition message is periodically transmitted from a CMTS to a CM to announce the allocation of a new SID. The Dynamic Session Addition message contains a new SID value, and type/length/value fields which can encode a RSVP filter spec and RSVP "cleanup timeout" interval to support the RSVP "soft state" approach. The CM is arranged to use the new SID exclusively for upstream traffic that matches the filter spec, thereby allowing classification to be performed by the CM. The CM preferably assumes that a SID is refreshed by the receipt of another Dynamic Session Addition message within the cleanup timeout interval. Otherwise, the SID is ignored by the CM at the conclusion of the interval.

In addition, a Dynamic Session Deletion message can be transmitted from the CMTS to the CM to delete an unused SID immediately, thereby supporting an RSVP explicit "teardown" message. A Dynamic Session Acknowledgment message is transmitted from the CM to the CMTS to acknowledge receipt of a Dynamic Session Addition or Dynamic Session Deletion message.

Figure 1:
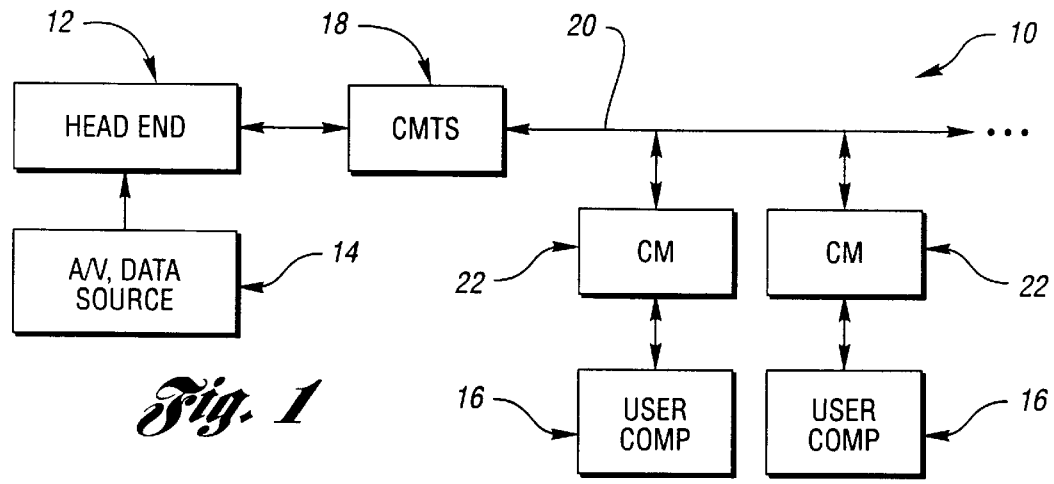
FIG. 1 is a block diagram of a basic cable data network system.
Figure 2:
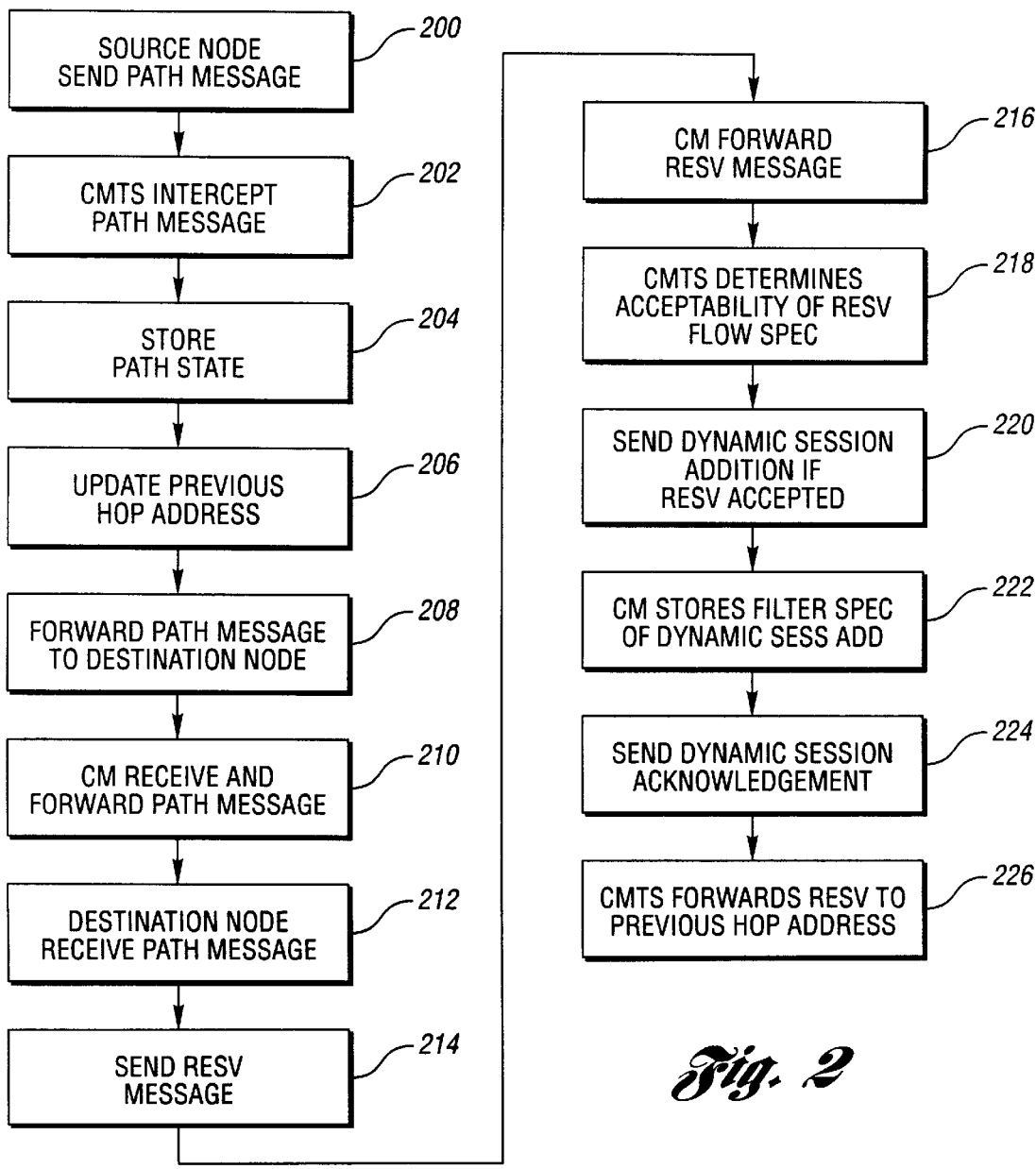
FIG. 2 is a flowchart illustrating resource reservation and MAC management operation in accordance with the present invention.

Referring now to FIG. 2, a flowchart illustrates overall management between an explicit RSVP "Path" and "Resv" message with the Dynamic Session messages of the present invention. More specifically, a data flow source-node generates an RSVP Path message and sends the message toward a data flow destination node at block 200. The CMTS will intercept the downstream RSVP Path message at block 202, store the path state from the message at block 204, update the previous hop address in the message at block 206 to include the CMTS address, and forward the message at block 208. As shown at block 210, the CM then forwards the downstream RSVP Path message to the destination-node without processing.

At block 212, the data flow destination-node receives the RSVP Path message, and replies at block 214 with an RSVP Resv message to request an upstream reservation of bandwidth resources for the data flow to be sent by the source-node to the destination node. The RSVP Resv message is sent to the previous hop address of the Path message, i.e., the CMTS. At block 216, the CM forwards the upstream RSVP Resv message to the CMTS without processing. When the CMTS receives the upstream RSVP Resv message, the message flow spec is processed at block 218 using an admission control and policy control protocol in cooperation with the CMTS upstream bandwidth scheduler.

Upon acceptance of the Resv reservation message by the CMTS, the CMTS then sends a Dynamic Session Addition MAC message as described above to the CM at block 220. The message includes a new SID and the filter spec from the RSVP Resv message. The CM receives the Dynamic Session Addition MAC message, stores the new SID and filter spec at block 222, and sends a Dynamic Session Acknowledgment MAC message back to the CMTS at block 224. The CMTS receives the Dynamic Session Acknowledgment MAC message at block 224, and forwards the RSVP Resv message to the previous hop address at block 226. Communication can then take place.

Thus, the present invention provides upstream bandwidth resource reservation which allows packet scheduling to occur at the CMTS, and packet classification to occur at a CM. Such an arrangement allows the RSVP protocol to be adapted for use at the OSI protocol layer of a typical CM, thereby improving efficiency of network resource allocation.

While the best mode for carrying out the invention has been described in detail, those familiar with the art to which this invention relates will recognize various alternative designs and embodiments for practicing the invention as defined by the following claims.

What is claimed is:

1. A method for dynamically allocating upstream network resources in a packet-based broadband cable data distribution network having a CMTS (cable modem termination system) connected to each of a plurality of user terminals via a cable modem, said method comprising:

performing packet classification at a cable modem by transmitting a resource reservation signal from a user terminal via an associated cable modem indicative of an amount of network resources needed for upstream communication;

performing packet scheduling at a CMTS by determining whether upstream resources are available based on the reservation signal, and if so, generating at the CMTS a SID (service identification) message comprising at least one filter spec parameter responsive to the reserved resources;

receiving the SID message at the cable modem requesting the resource reservation;

setting a filter spec parameter in the cable modem equal to the at least one filter spec parameter in the received SID message for sending an upstream communication matching the set filter spec parameter;

determining that the SID was not used for an upstream communication; and sending a session deletion message from the CMTS to the cable modem if the SID was not used.

2. The method of claim 1 further comprising sending an acknowledgment signal from the cable modem to the CMTS after setting of the filter spec parameter.

3. The method of claim 1 further comprising detecting that a SID has not been utilized by a cable modem, and sending a reservation termination message from the CMTS indicating termination of the SID message.

4. The method of claim 1 wherein a source node generates an RSVP protocol path message for sending a signal to a destination node, said method further comprising:

passing the RSVP path message to the destination node; and sending the resource reservation signal from the cable modem of the destination node based on the received RSVP path message.

5. The method of claim 4 wherein passing the RSVP path message to the destination node comprises updating a hop address in the message to include a CMTS address, and sending the resource reservation signal to the CMTS using the updated hop address.

6. The method of claim 4 wherein the CMTS performs the packet scheduling by processing a flow spec parameter in the received resource reservation signal.

7. The method of claim 4 wherein the SID is sent as part of a dynamic session addition MAC message.

8. The method of claim 1 further comprising sending a session acknowledgment message to the CMTS from the cable modem in response to the session deletion message.

* * * * *